(12) United States Patent
Nakamura et al.

(10) Patent No.: US 7,799,433 B2
(45) Date of Patent: Sep. 21, 2010

(54) SILICONE-BASED PRESSURE-SENSITIVE ADHESIVE AND ADHESIVE TAPE

(75) Inventors: Akihiro Nakamura, Ichihara (JP); Teruhito Maruyama, Isehara (JP)

(73) Assignee: Dow Corning Toray Company, Ltd., Tokyo (JP)

( * ) Notice: Subject to any disclaimer, the term of this patent is extended or adjusted under 35 U.S.C. 154(b) by 674 days.

(21) Appl. No.: 11/571,404

(22) PCT Filed: Jun. 20, 2005

(86) PCT No.: PCT/JP2005/011685

§ 371 (c)(1),
(2), (4) Date: Sep. 14, 2007

(87) PCT Pub. No.: WO2006/003853

PCT Pub. Date: Jan. 12, 2006

(65) Prior Publication Data

US 2007/0299216 A1  Dec. 27, 2007

(30) Foreign Application Priority Data

Jul. 2, 2004  (JP) ............................. 2004-197477

(51) Int. Cl.
*B32B 9/04* (2006.01)
*C08L 83/04* (2006.01)

(52) U.S. Cl. ....................... 428/447; 524/188; 524/257; 524/323; 524/335; 524/336; 524/342; 524/349; 524/351; 524/588; 525/477; 525/478; 528/15; 528/31; 528/32

(58) Field of Classification Search ........................ None
See application file for complete search history.

(56) References Cited

U.S. PATENT DOCUMENTS

| | | | |
|---|---|---|---|
| 4,515,702 A * | 5/1985 | Mori et al. ................... | 508/204 |
| 4,879,378 A | 11/1989 | Foster et al. | |
| 4,888,375 A | 12/1989 | Greco et al. | |
| 5,319,010 A * | 6/1994 | Mitani et al. ................. | 524/252 |
| 6,815,076 B2 | 11/2004 | Aoki | |
| 7,323,250 B2 * | 1/2008 | Tabei et al. .................. | 428/447 |

FOREIGN PATENT DOCUMENTS

| | | |
|---|---|---|
| EP | 0395361 A3 | 10/1990 |
| EP | 0717065 A1 | 6/1996 |
| EP | 0771862 A1 | 5/1997 |
| JP | 61043692 | 3/1986 |
| JP | 1272682 | 10/1989 |
| JP | 2261823 | 10/1990 |
| JP | 2283765 | 11/1990 |
| JP | 07011228 | 1/1995 |
| JP | 2003096429 | 4/2003 |
| WO | WO 2004111151 | 12/2004 |

OTHER PUBLICATIONS

Product data sheet for CHIMASSORB 944 (no. date).*
English language abstract for JP1272682 extracted from espacenet.com, May 28, 2007.
English language translation for JP07-011228 extracted from Searching PAJ, 16 pages.
English language abstract for JP2261823 extracted from espacenet.com, May 28, 2007.
English language abstract for JP2283765 extracted from espacenet.com, May 28, 2007.
English laguage abstract for JP61043692 extracted from espacenet.com, May 28, 2007.
English language abstract for JP2003096429 extracted from espacenet.com, May 28, 2007.

* cited by examiner

*Primary Examiner*—Marc S Zimmer
(74) *Attorney, Agent, or Firm*—Howard & Howard Attorneys PLLC

(57) ABSTRACT

A silicone-based pressure-sensitive adhesive comprising: (A) a mixture or a product of partial condensation of (a) a raw rubberlike organopolysiloxane having an average of at least one alkenyl group per molecule and (b) an organopolysiloxane resin consisting essentially of $R^1{}_3SiO_{1/2}$ units and $SiO_{4/2}$ units; (B) an organopolysiloxane having an average of at least two silicon-bonded hydrogen atoms per molecule; (C) a phenol-type oxidation inhibitor and/or a phenol-modified organosiloxane; (D) an aromatic amino-type oxidation inhibitor and/or aromatic amino-modified organosiloxane; and (E) a platinum-based catalyst, can form a pressure-sensitive adhesive layer that maintains good removability after being exposed to high temperatures.

6 Claims, No Drawings

SILICONE-BASED PRESSURE-SENSITIVE ADHESIVE AND ADHESIVE TAPE

RELATED APPLICATIONS

This application claims priority to and all the advantages of International Patent Application No. PCT/JP2005/011685, filed on Jun. 20, 2005, which claims priority to Japanese Patent Application No. JP 2004-197477, filed on Jul. 2, 2004.

TECHNICAL FIELD

The present invention relates to a silicone-based pressure-sensitive adhesive and to an adhesive tape prepared by using the aforementioned adhesive. More specifically, the invention relates to a silicone-based pressure-sensitive adhesive capable of forming a pressure-sensitive adhesive layer of good removability after being exposed to a high temperature. The invention also relates to an adhesive tape that preserves good removability after exposure to high temperatures.

BACKGROUND ART

Silicone-based pressure-sensitive adhesives are characterized by excellent electrical-insulating properties, resistance to heat, adhesive strength, and other useful properties, and therefore they find wide application in situations that require reliability.

In particular, in order to improve heat-resistant properties of silicone-based pressure-sensitive adhesives, it has been proposed to combine them with cerium-containing compounds (see Japanese Patent Publication No. Hei 6-96698), substances that contain organosilicon compounds with B—O—Si bonds (see Japanese Patent Application Laid-Open No. Hei 7-11228), or phenol-based oxidation inhibitors (see Japanese Patent Application Laid-Open No. 2003-96429, corresponding to U.S. Pat. No. 6,815,076).

However, the use of adhesive tapes that utilize silicone-based pressure-sensitive adhesives with cerium-containing compounds or with substances that contain organosilicon compounds having B—O—Si bonds is associated with a problem. This problem is that peeling of these adhesive tapes from their substrates after expose to high temperatures leaves a part of the pressure-sensitive adhesive layer on the substrate. As compared to the adhesives of the aforementioned type, the adhesives with phenol-based oxidation inhibitors are subject to the above problem to a lesser degree, but they still leave a part of the pressure-sensitive adhesive layer on a substrate if exposed to high temperatures over a long time. Therefore, when the adhesive tapes based on the use of the aforementioned pressure-sensitive adhesives are used as masking tapes, e.g., in solder reflow processes on printed-circuit boards, the residual pressure-sensitive adhesive layer left on the surface of the heat-treated substrate after removal of the tape creates problems for subsequent processing of the product.

It is an object of the present invention to provide a silicone-based pressure-sensitive adhesive capable of forming a pressure-sensitive adhesive layer that maintains good removability after being exposed to high temperatures. It is another object to provide an adhesive tape that preserves good removability after being exposed to high temperatures.

DISCLOSURE OF INVENTION

A silicone-based pressure-sensitive adhesive of the present invention comprises:
(A) a mixture or a partial condensation product of (a) a raw rubberlike organopolysiloxane having an average of at least one alkenyl group per molecule, and (b) an organopolysiloxane resin consisting essentially of $R^1{}_3SiO_{1/2}$ units (wherein $R^1$ is a substituted or unsubstituted univalent hydrocarbon group) and $SiO_{4/2}$ units, with a molar ratio of $R^1{}_3SiO_{1/2}$ units to $SiO_{4/2}$ units within the range of 0.5 to 1.5;
(B) an organopolysiloxane having an average of at least two silicon-bonded hydrogen atoms per molecule, wherein the silicon-bonded hydrogen atoms of this component are present in an amount of 0.5 to 150.0 moles per 1 mole of the alkenyl groups in component (A);
(C) a phenol-type oxidation inhibitor and/or a phenol-modified organosiloxane, in an amount of 0.001 to 10 parts by weight per 100 parts by weight of the sum of components (A) and (B);
(D) an aromatic amino-type oxidation inhibitor and/or aromatic amino-modified organosiloxane in an amount of 0.001 to 10 parts by weight per 100 parts by weight of the sum of components (A) and (B); and
(E) a platinum-based catalyst in an amount sufficient for curing the adhesive.

An adhesive tape of the invention comprises a film substrate and a silicone-based pressure-sensitive adhesive layer formed on the film substrate by curing the aforementioned silicone-based pressure-sensitive adhesive on the film substrate.

EFFECTS OF INVENTION

The silicone-based pressure-sensitive adhesive of the present invention is suitable for forming a pressure-sensitive adhesive layer that preserves good removability after exposure to high temperatures. The adhesive tape of the invention also possesses the property of good removability after exposure to high temperatures.

DETAILED DESCRIPTION OF THE INVENTION

The following is a more detailed description of the silicone-based pressure-sensitive adhesive of the present invention.

Component (A), which is one of the main components of the composition, is a mixture of (a) a raw rubberlike organopolysiloxane having an average of at least one alkenyl group per molecule and (b) an organopolysiloxane resin consisting essentially of $R^1{}_3SiO_{1/2}$ units (wherein $R^1$ is a substituted or unsubstituted univalent hydrocarbon group) and $SiO_{4/2}$ units, with a molar ratio of $R^1{}_3SiO_{1/2}$ units to $SiO_{4/2}$ units within the range of 0.5 to 1.5. Component (A) also may comprise a product of partial condensation of the aforementioned constituents.

A raw rubberlike organopolysiloxane of constituent (a) contains an average of at least one alkenyl group per molecule. If the average number of alkenyl groups contained in one molecule of the constituent (a) is less than 1, the obtained pressure-sensitive adhesive will have low cohesive strength (holding strength). When constituent (a) is a raw rubberlike, it is recommended that its plasticity be within the range of 50 to 200, preferably 80 to 180 (plasticity is measured in accordance with JIS K 6249 for 3 min. at 25° C. with application of 1 kgf force to a 4.2 g spherical sample). Although there are no special restrictions to the molecular structure of constituent (a), the linear or partially branched linear molecular structure is preferable. Alkenyl groups of constituent (a) may be represented, e.g., by vinyl, allyl, butenyl, or pentenyl groups, of which vinyl groups are preferable. Silicon-bonded groups other than alkenyl groups of constituent (a) may be represented, e.g., by methyl, ethyl, propyl, butyl, pentyl, heptyl, or similar alkyl groups; phenyl, tolyl, xylyl, or similar aryl groups; benzyl, phenethyl, or similar aralkyl groups; chloromethyl, 3-chloropropyl, 3,3,3-trifluoropropyl, or similar halogenated alkyl groups, or other univalent hydrocarbons; hydroxyl groups, methoxy, ethoxy, propoxy, or similar alkoxy groups; acetoxy groups; isopropenoxy groups; aminoxy groups, or a similar hydrolysable group. Most preferable of the above are methyl and phenyl groups. In case constituent (a) is subjected to partial condensation with below-described constituent (b), constituent (a) should contain at least 0.01 wt. % of silicon-bonded hydroxyl groups or silicon-bonded hydrolysable groups.

Constituent (b) is an organopolysiloxane resin that consists essentially of $R^1_3SiO_{1/2}$ units and $SiO_{4/2}$ units. In the above formulae, $R^1$ is a substituted or unsubstituted univalent hydrocarbon group, such as a methyl, ethyl, propyl, butyl, pentyl, heptyl, or a similar alkyl group; a vinyl, allyl, butenyl, pentenyl, or a similar alkenyl group; a phenyl, tolyl, xylyl, or a similar aryl group; a benzyl, phenethyl, or a similar aralkyl group; a chloromethyl, 3-chloropropyl, 3,3,3-trifluoropropyl, or a similar halogenated alkyl group, or another substituted or unsubstituted univalent hydrocarbon group. Most preferable of the above are methyl, vinyl, and phenyl groups. In case constituent (b) is subjected to a reaction of partial condensation with aforementioned constituent (a), constituent (b) should contain at least 0.01 wt. % of silicon-bonded hydroxyl groups or silicon-bonded hydrolysable groups. The hydrolysable groups can be represented by methoxy, ethoxy, propoxy, or similar alkoxy groups; acetoxy groups; isopropenoxy groups; and aminoxy groups. Constituent (b) consists essentially of $R^1_3SiO_{3/2}$ units and $SiO_{4/2}$ units. It may also contain $R^1_2SiO_{2/2}$ units and $R^1SiO_{3/2}$ units. It is recommended that the sum of $R^1_3SiO_{3/2}$ units and $SiO_{4/2}$ units in constituent (b) be greater than 50 wt. %, preferably greater than 80 wt. %, and even more preferably, equal to 100 wt. %, i.e., it is preferable that constituent (b) consists of units only of the aforementioned two types. The mole ratio of $R^1_3SiO_{3/2}$ units to $SiO_{4/2}$ units should be within the range of 0.5 to 1.5, preferably 0.5 to 1.0, and even more preferably, 0.6 to 0.9. If the aforementioned mole ratio is below the lower recommended limit, the obtained pressure-sensitive adhesive will have low adhesive strength. If, on the other hand, the ratio exceeds the upper recommended limit, this will reduce cohesive strength of the obtained pressure-sensitive adhesive.

Component (A) may comprise a mixture of constituents (a) and (b) or a product of their partial condensation. In component (A), constituents (a) and (b) should be used in a weight ratio of (1:9) to (9:1), preferably (2:8) to (8:2), and even more preferably, (3:7) to (7:3). Partial condensation can be carried out by various methods, e.g., by partial condensation with heating or in the presence of a catalyst, such as potassium hydroxide, barium hydroxide or a similar base; ammonia water; methylamine, ethylamine, propylamine, or a similar amine; tetrabutyl titanate, tetraisobutyl titanate, or a similar titanium compound; octyltin diacetate, or a similar tin compound; hexamethyldisilazane, etc.

Component (B) is a cross-linking agent of the composition. It comprises an organopolysiloxane having an average 2 or more silicon-bonded hydrogen atoms per molecule. The position of bonding to silicon may be at the molecular terminals and/or at the side chain. Groups other than hydrogen atoms that can be bonded to silicon may be represented by methyl, ethyl, propyl, butyl, pentyl, hexyl, heptyl, or similar alkyl groups; phenyl, tolyl, xylyl, naphthyl, or similar aryl groups; benzyl, phenethyl, or similar aralkyl groups; chloromethyl, 3-chloropropyl, 3,3,3-trifluoropropyl, or similar halogenated alkyl groups, and other substituted or unsubstituted univalent hydrocarbon groups, except for alkenyl groups. Most preferable are methyl and phenyl groups. Component (B) may have a linear, branched, cyclic, net-like, or partially branched linear molecular structure. The linear molecular structure is preferable. Although there are no special restriction with regard to the viscosity of component (B) at 25° C., it is recommended to have viscosity within the range of 0.1 to 500,000 mPa·s, preferably, within the range of 1 to 100,000 mPa·s.

The organopolysiloxane of component (B) can be exemplified by the following compounds: methylhydrogenpolysiloxanes having both molecular terminals capped with trimethylsiloxy groups, a copolymer of methylhydrogensiloxane and dimethylsiloxane capped at both molecular terminals with trimethylsiloxy groups, a copolymer of methylphenylsiloxane, methylhydrogensiloxane, and dimethylsiloxane capped at both molecular terminals with trimethylsiloxy groups, dimethylpolysiloxane capped at both molecular terminals with dimethylhydrogensiloxy groups, a copolymer of methylphenylsiloxane and dimethylsiloxane having both molecular terminals capped at both molecular terminals with dimethylhydrogensiloxy groups, methylphenylpolysiloxane having both molecular terminals capped with dimethylhydrogensiloxy groups, an organopolysiloxane resin composed of siloxane units represented by formula $R^2_3SiO_{1/2}$, siloxane units represented by formula $R^2_2HSiO_{1/2}$, and siloxane units of formula $SiO_{4/2}$, an organopolysiloxane resin composed of siloxane units represented by formula $R^2_2HSiO_{1/2}$ and siloxane units represented by formula $SiO_{4/2}$, an organopolysiloxane resin composed of siloxane units represented by formula $R^2HSiO_{2/2}$ and siloxane units represented by formula $R^2SiO_{3/2}$ or $HSiO_{3/2}$, or a mixture of two or more of the aforementioned organopolysiloxanes. In the above formulae, $R^2$ may be represented by the same substituted or unsubstituted univalent hydrocarbon groups as defined above, except for alkenyl groups.

Component (B) should be used in an amount such that the silicon-bonded hydrogen atoms present in the component is in the range of 0.5 to 150 moles, preferably 0.6 to 150.0 moles, more preferably, 0.7 to 140.0 mole, and even more preferably 0.8 to 130.0 moles, per 1 mole of total alkenyl groups of component (A). If component (B) is used in the amount less than the lower recommended limit, it will be either difficult to provide complete curing of the obtained pressure-sensitive adhesive, or the obtained adhesive will have insufficient cohesive strength (holding strength). If, on the other hand, component (B) is used in the amount exceeding the upper recommended limit, this will increase resistance to peeling of the pressure-sensitive adhesive from a paper, or film substrate. Furthermore, the aforementioned resistance to peeling will grow with the lapse of time.

Component (C) is used for improving removability after exposure to high temperatures. This component comprises a phenol-based oxidation inhibitor and/or a phenol-modified organosiloxane. The phenol-based oxidation inhibitor may comprise a monophenol-based oxidation inhibitor, biphenol-based oxidation inhibitor, polyphenol-based oxidation inhibitor, or a hindered-phenol oxidation inhibitor, of which preferable is the hindered-phenol oxidation inhibitor. The following are specific examples of phenol-based oxidation inhibitors of component (C): 2,6-di-tert-butyl-p-crezol, 2,4, 6-tri-tert-butylphenol, n-octyl-3-(4'-hydroxy-3',5'-di-tert-butylphenol) propionate, n-octadecyl-3-(4'-hydroxy-3',5'-di-tert-butylphenol) propionate, styrenated phenol, 4-hydroxymethyl-2,6-di-tert-butylphenol, 2,5-di-tert-butylhydroquinone, cyclohexylphenol, butylhydroxyanisole, 2,2'-methylene-bis (4-methyl-6-tert-butylphenol), 2,2'-methylene-bis (4-ethyl-6-tert-butylphenol), 4,4'-i-propylydene bisphenol, 1,1-bis-(4-hydroxyphenyl)cyclohexane, 4,4'-methylene-bis (2,6-di-tert-butylphenol), 2,6-bis (2'-hydroxy-3'-tert-butyl-5'-methylbenzyl)-4-methylphenol, 1,1,3-tris (2-methyl-4-hydroxy-5-tert-butylphenyl)butane, 1,3,5-tris'methyl-2,4,6-tris (3,5-di-tert-butyl-4-hydroxybenzyl) benzene, tetrakis [methylene-3-(3,5-di-tert-butyl-4-hydroxyphenyl)propionate]methane, 4-hydroxy-3,5-di-tert-butylphenyl trimethoxysilane, 4-hydroxy-3,5-di-tert-butylphenyl triethoxysilane, 4-hydroxy-3,5-di-tert-butylphenyl methyldimethoxysilane, 3-(4-hydroxy-3,5-di-tert-butylphenyl)propyltrimethoxysilane, 3-(4-hydroxy-3,5-di-tert-butylphenyl)propylmethyldimethoxysilane, and 3-(4-hydroxy-3,5-di-tert-butylphenyloxy) propyltrimethoxysilane.

There are no special restrictions with regard to the phenol-modified organosiloxane of component (C), provided that it has at least one hydroxyphenyl-containing group bonded to silicon atom per molecule. There are no restrictions with regard to the bonding position of the hydroxyphenyl-containing group. For example, it can be bonded to molecular terminals and/or to the molecular side chain. There are no restrictions also with regard to the molecular structure of such an organosiloxane that may have a linear, cyclic, branched, or a partially branched linear molecular structure. The linear structure is preferable. The aforementioned phenol-modified organosiloxane may be represented, e.g., by the following average formula: $R^3_a SiO_{(4-a)/2}$, where $R^3$ is a substituted or unsubstituted univalent hydrocarbon group, a hydroxyphenyl-containing group represented by the following general formula:

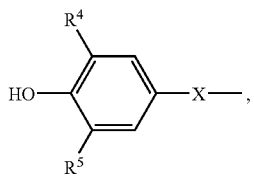

or a hydroxyphenyl-containing group represented by the following general formula:

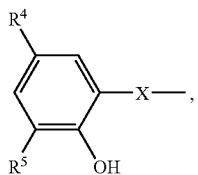

with the proviso that at least one $R^3$ in one molecule can be represented by any of the aforementioned hydroxyphenyl-containing groups.

The following are examples of substituted and unsubstituted univalent hydrocarbon groups designated by $R^3$: methyl, ethyl, propyl, butyl, pentyl, hexyl, heptyl, or similar alkyl groups; vinyl, allyl, butenyl, pentenyl, or similar alkenyl groups; phenyl, tolyl, xylyl, naphthyl, or similar aryl groups; benzyl, phenethyl, or similar aralkyl groups; chloromethyl, 3-chloropropyl, 3,3,3-trifluoropropyl, or similar halogenated alkyl groups.

Furthermore, the hydroxyphenyl-containing groups designated by $R^3$ may be represented also by the following general formula:

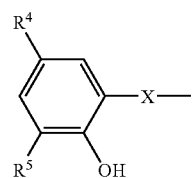

or by the following general formula:

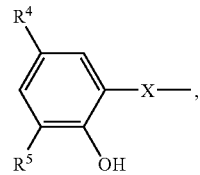

where $R^4$ and $R^5$ may be the same or different linear or branched alkyl groups with 1 to 10 carbon atoms. Such linear alkyl groups can be exemplified by methyl, ethyl, propyl, butyl, pentyl, hexyl, and heptyl groups. The aforementioned branched alkyl groups can be exemplified by isopropyl, tert-butyl, and tert-pentyl groups. In the above formulae, X designates a single bond, oxy group, alkylene group, oxyalkylene group, or alkylenecarbonyl oxyalkylene group. The alkylene groups can be represented by methylene, ethylene, and propylene groups. The oxyalkylene group can be represented by an oxyethylene and oxypropylene group, while the aforementioned alkylenecarbonyl oxyalkylene group can be represented by an ethylenecarbonyl oxypropylene group and propylenecarbonyl oxypropylene group. In the above formulae, "a" is a number within the range of 1.5 to 3.0, preferably within the range of 1.8 to 3.0.

The aforementioned phenol-modified organosiloxane is disclosed, e.g., in Japanese Patent Application Laid-Open Nos. Sho 61-43692 and Hei 2-261823 and can be represented by the following specific compounds. In the following formulae, "m" and "n" are positive numbers.

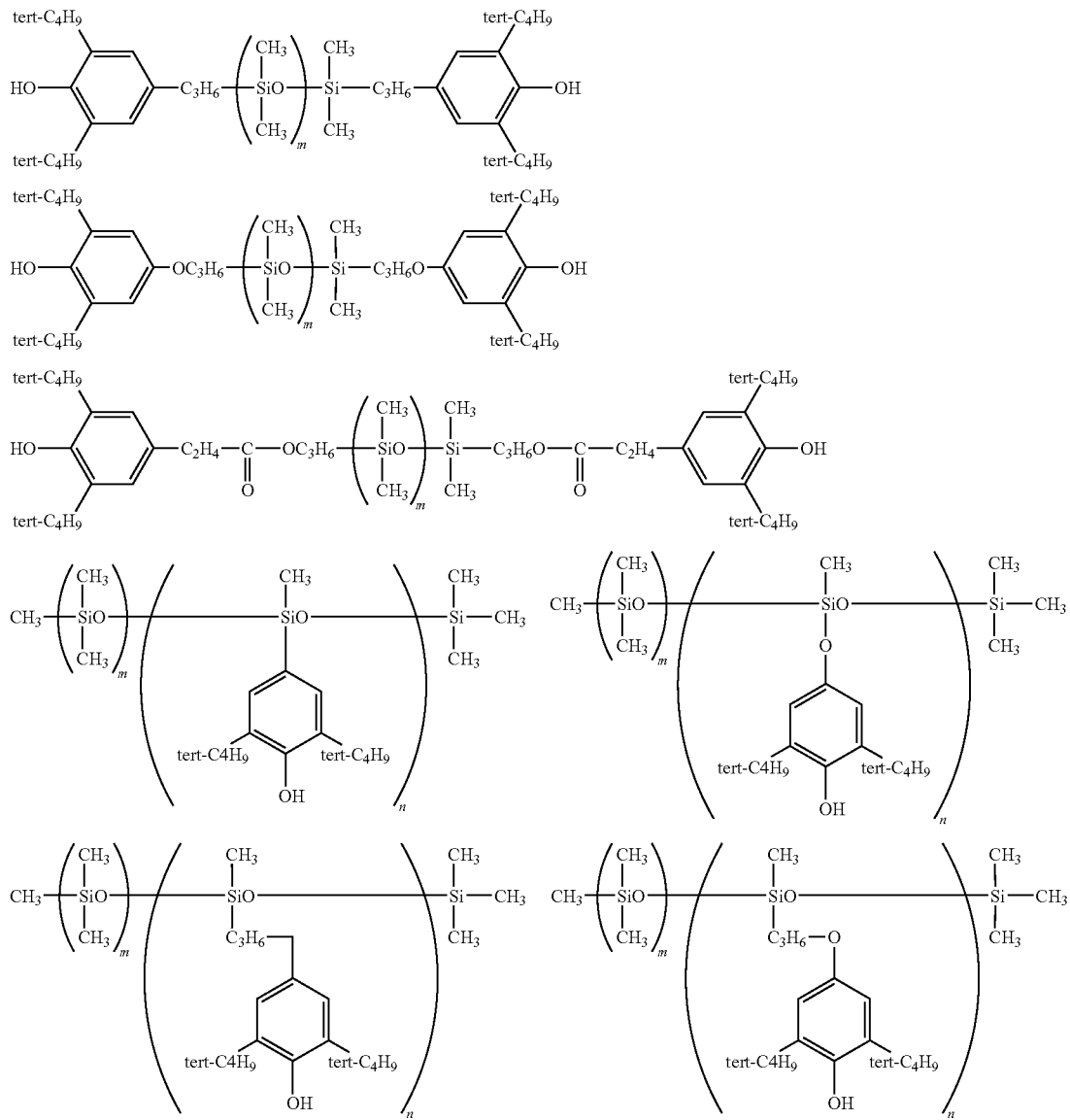

-continued

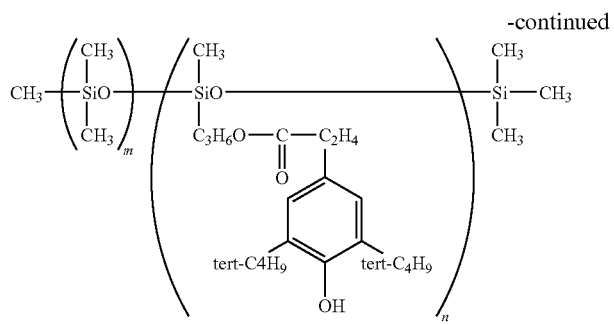

Component (C) should be used in the amount of 0.001 to 10 parts by weight, preferably 0.005 to 8 parts by weight, and even more preferably 0.01 to 5 parts by weight per 100 parts by weight of the sum of components (A) and (B). If component (C) is added in the amount less than the lower recommended limit, this may impair removability after exposure to high temperatures. If, on the other hand, component (C) is added in the amount exceeding the upper recommended limit, this will either lead to incomplete curing, or reduce cohesive strength and tack of the composition.

In combination with component (C), component (D) also improves removability after exposure to high temperatures. Component (D) may comprise an aromatic amino-type oxidation inhibitor and/or an aromatic amino-modified organosiloxane. The aromatic amino-type oxidation inhibitor may be exemplified by a phenyl-α-naphthylamine, phenyl-β-naphthylamine, or a similar naphthylamine-type oxidation inhibitor; 4,4'-(α,α-dimethylbenzyl) diphenylamine, 4,4'-dioctyl-diphenylamine, a high-temperature reaction product of diphenylamine and acetone, a low-temperature reaction product of diphenylamine and acetone, a low-temperature reaction product of diphenylamine, aniline, and acetone, a reaction product of diphenylamine and diisobutylene, octylated diphenylamine, substituted diphenylamine, alkylated diphenylamine, diphenylamine derivatives, or other diphenylamine-type oxidation inhibitors; N,N'-diphenyl-p-phenylenediamine, N,N'-di-β-naphthyl-p-phenylenediamine, N-cyclohexyl-N'-phenyl-p-phenylenediamine, N-phenyl-N'-isopropyl-p-phenylenediamine, N-phenyl-N'-(3-methacryloyloxy-2-hydroxypropyl)-p-phenylenediamine, N,N'-bis (1-methylheptyl)-p-phenylenediamine, N,N'-bis (1,4-dimethylpentyl)-p-phenylenediamine, N-(1,3-dimethylbutyl)-N'-phenyl-p-phenylenediamine, a mixture of diallyl-p-phenylenediamine, phenyl-octyl-p-phenylenediamine, or a similar p-phenylenediamine-type oxidation inhibitor; a mixture of phenyl-α-naphthylamine and diphenyl-p-phenylenediamine, and a mixture of amines such as N-isopropyl-N'-phenyl-p-phenylenediamine and 6-ethoxy-2,2,4-trimethyl-1,2-dihydroquinoline.

There are no special restrictions with regard to the aromatic amino-modified organosiloxane of component (D), provided that it has at least one bonded aromatic amino-containing group per molecule. There are no restrictions with regard to the bonding position of the aromatic amino-containing group. For example, it can be bonded to molecular terminals and/or to the molecular side chain. There are no restrictions also with regard to the molecular structure of such an organosiloxane that may have a linear, cyclic, branched, or a partially branched linear molecular structure. The linear structure is preferable. The aforementioned aromatic amino-modified organosiloxane may be represented, e.g., by the following average formula:

$R^6_b SiO_{(4-b)/2}$, where $R^6$ is a substituted or unsubstituted univalent hydrocarbon group, an aromatic amino-containing group represented by the following general formula:

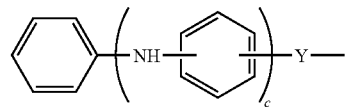

and aromatic amino-containing group represented by the following general formula:

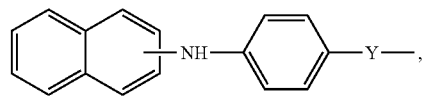

with the proviso that at least one $R^6$ in one molecule can be represented by any of the aforementioned aromatic amino-containing groups.

The substituted or unsubstituted univalent hydrocarbon groups designated by $R^6$ can be represented by the same hydrocarbon groups as mentioned above, wherein an aromatic amino-containing group of $R^6$ can be exemplified either by the following general formula:

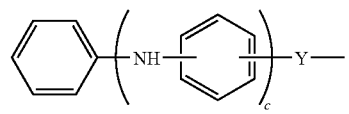

or by the following general formula:

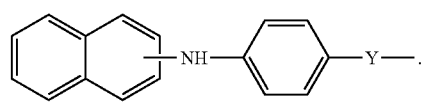

In the above formula, Y is a single bond, oxy group, alkylene group, or an axyalkylene group, wherein the alkoxyalkylene group can be represented by a methylene, ethylene, and propylene group. The oxyalkylene group can be represented by an oxymethylene, oxyethylene, and oxypropylene group. In the above formula, "c" is 1 or 2, and "b" is a number between 1.5 and 3.0, preferably between 1.8 and 3.0.

The aforementioned aromatic amino-modified organosiloxanes are disclosed, e.g., in Japanese Patent Application Laid-Open No. Hei 2-283765 and can be exemplified by the compounds represented by the following formulae, where "m" and "n" are positive numbers:

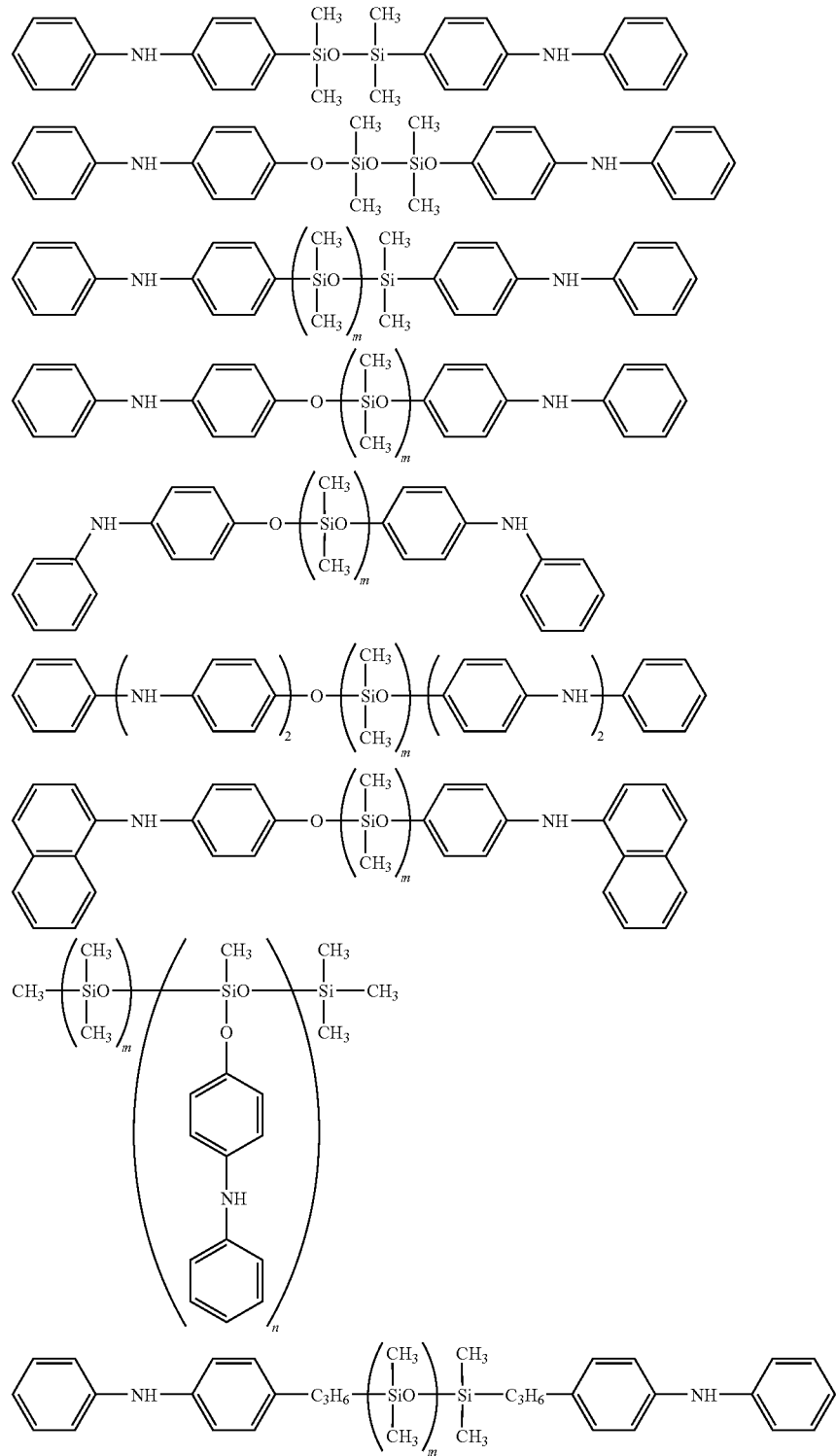

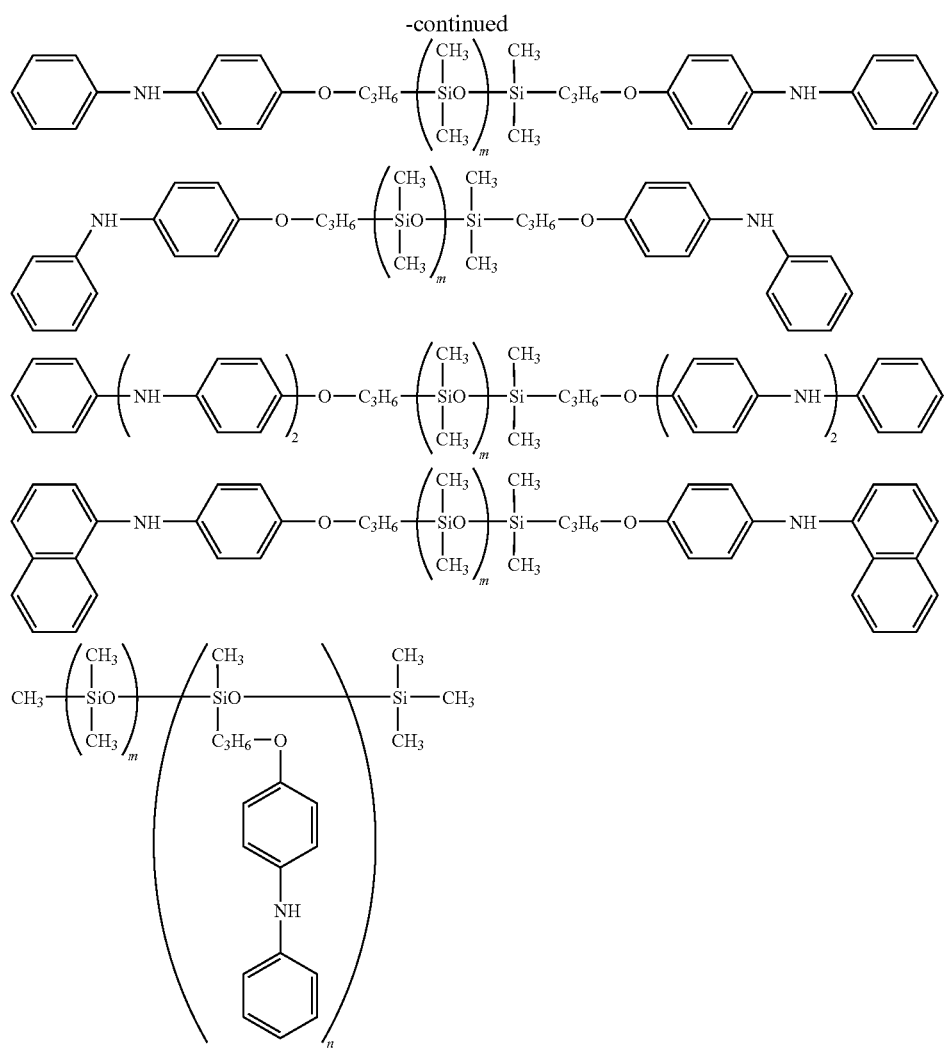

In the composition of the adhesive, component (D) should be used in an amount of 0.001 to 10 parts by weight, preferably 0.005 to 8 parts by weight, even more preferably, 0.01 to 5 parts by weight per 100 parts by weight of the sum of components (A) and (B). If component (D) is added in the amount that is less than the lower recommended limit, this may impair removability after exposure to high temperatures. If, on the other hand, component (D) is added in the amount exceeding the upper recommended limit, this will either lead to incomplete curing, or reduce cohesive strength and tack of the composition.

Component (E) is a platinum-type catalyst that accelerates cross-linking of the composition. Component (E) may be exemplified by a chloroplatinic acid, an alcoholic solution of a chloroplatinic acid, a platinum-carbonyl complex, a platinum-alkenylsiloxane complex, and a platinum-olefin complex. The platinum-alkenylsiloxane complex is preferable in view of its good miscibility with component (A). The platinum-alkenylsiloxane complex can be exemplified by 1,3-divinyl-1,1,3,3-tetramethyldisiloxane and 1,1,3,3-tetravinyl-1,3-dimethyldisiloxane.

Component (E) should be used in an amount sufficient to accelerate curing of the composition. For example, in weight units, it can be added in such an amount that the content of metal platinum in component (E) constitutes 0.1 to 1,000 ppm, preferably 1 to 500 ppm per component (A). If component (E) is added in the amount less than the lower recommended limit, this will delay curing of the obtained pressure-sensitive adhesive. If, on the other hand, the added amount of component (E) exceeds the upper recommended limit, this may lead to discoloration of the obtained pressure-sensitive adhesive.

The adhesive of the present invention is composed of components (A) through (E), but if necessary to adjust the rate of curing, the composition may be additionally combined with curing reaction adjusters such as 2-methyl-3-butyl-2-ol, 3,5-dimethyl-1-hexyn-3-ol, 3-methyl-1-penten-3-ol, 2-phenyl-3-butyn-2-ol, or similar alkyne alcohols; 3-methyl-3-penten-1-yne, 3,5-dimethyl-3-hexen-1-yne or similar enyne compounds; 1,3,5,7-tetramethyl-1,3,5,7-tetravinyl-cyclotetrasiloxane, 1,3,5,7-tetramethyl-1,3,5,7-tetrahexenyl-cyclotetrasiloxane, or similar alkenylsiloxane compounds, etc.

The aforementioned curing reaction adjusters should be added in efficient amounts sufficient for adjusting the curing rate of the adhesive composition. Normally, the added amount does not exceed 5 parts by weight per 100 parts by weight of component (A). If the added amount exceeds 5 parts by weight, this may delay the rate of curing.

If necessary, the composition of the adhesive may be combined with other additives such as toluene, xylene, hexene, heptane, acetone, methylethylketone, methylisobutylketone, or similar organic solvents; tetramethoxysilane, tetraethoxysilane, dimethyldimethoxysilane, methylphenyldimethoxysilane, methylphenyldiethoxysilane, phenyltrimethoxysilane, methyltrimethoxysilane, methyltriethoxysilane, vinyltriethoxysilane, allyltrimethoxysilane, allyltriethoxysilane, 3-glycidoxypropyltytrimethoxysilane, 3-methacryloxypropyltrimethoxysilane, or similar alkoxysilane compounds; as well as various antioxidants, pigments, stabilizers, etc.

The silicone-based pressure-sensitive adhesive of the present invention is prepared by mixing aforementioned components (A) to (E), if necessary, with the addition of other arbitrary component. After the obtained adhesive is applied onto a substrate, it is cured at room temperature or with heating to form a pressure-sensitive adhesive layer on the surface of the substrate. The adhesive can be applied by gravure coat, offset coat, offset gravure, roll coat, reverse-roll coat, air-knife coat, curtain coat, comma coat, etc.

The following is more detailed description of the adhesive tape of the invention.

The adhesive tape of the invention comprises a film substrate and a silicone-based pressure-sensitive adhesive layer formed by curing the aforementioned pressure-sensitive adhesive on the surface of the film substrate. The film substrates may be stretched or non-stretched plastic film substrates made from resins such as polyimide, polyethylene, polypropylene, polystyrene, polyvinyl chloride, polycarbonate, polyethylene terephthalate, Nylon, polyether-ether ketone, polyphenylene sulfide, liquid-crystal polyarylate, polyether sulfone, polyether imide, etc. The film substrates may also be comprised of the film-like plastics coated with the aforementioned resins. When it is required to provide heat-resistant properties, it is recommended to form the film substrate from polyimide (PI), polyether-ether ketone (PEEK), polyethylene naphthalate (PEN), liquid-crystal polyarylene, polyamidoimide (PAI), polyether sulfine (PES), Etc.

The adhesive tape of the invention is produced by applying the aforementioned silicone-based pressure-sensitive adhesive onto the surface of the film substrate, and then forming a pressure-sensitive adhesive layer on the surface of the film substrate by curing the adhesive at room temperature or with heating. The adhesive can be applied by the same methods as mentioned above. Curing with heat is preferable. Heating should be carried out at a temperature above 50° C., preferably within the range of 80 to 200° C.

EXAMPLES

The pressure-sensitive adhesive and adhesive tape of the invention will be further described in more detail with reference to practical and comparative examples. In the following examples, values of viscosities were measured at 25° C., gum plasticity was measured in accordance with the provisions of JIS K 6249 (with application of 1 kgf for 3 min. at 25° C. to a 4.2 g spherical specimen). Cohesive strength and removability after exposure to high temperatures were measured by the methods described below.

[Adhesive Strength]

A 40 μm-thick pressure sensitive adhesive layer was formed by curing a silicone-based pressure-sensitive adhesive on the surface of a 25 μm-thick substrate made from a polyimide resin, and an adhesive sheet was produced by heating the product for 3 min. at 120° C. The obtained adhesive sheet was cut into 25 mm-wide stripes to form adhesive tapes. By using rubber rollers at a pressure of 2 kgf, the adhesive tapes were adhered to a stainless-steel plate (SUS304) that was preliminarily polished with the use of #360 wet-polish abrasive paper. The assembly was kept for 30 min. at room temperature, and then cohesive strength of the adhesive was measured by a 180° peel-strength testing method with the use of a tensile tester operating at a constant stretching speed of 300 mm/min.

[Removability after Exposure to High Temperatures]

An adhesive sheet was produced by forming about a 40 μm-thick pressure-sensitive adhesive layer obtained after curing a silicone-based pressure-sensitive adhesive on a polyimide-resin substrate with subsequent heating of the coated substrate for 3 min. at 120° C. The obtained adhesive sheet was cut into 25 mm-wide stripes to form adhesive tapes. By using rubber rollers at a pressure of 2 kgf, the adhesive tapes were adhered to a stainless-steel plate (SUS304) that was preliminarily polished with the use of #360 wet-polish abrasive paper. The product was subjected to ageing by heating in an oven for 2 hours at a temperatures between 200° C. and 300° C. with an increment of 10° C. [i.e., at temperatures 200° C., 210° C., 220° C. . . . ], removed from the oven, maintained intact for 30 min., and tested for removability by a 180° peel-strength testing method with the use of a tensile tester operating at a constant stretching speed of 300 mm/min. The property was evaluated by visually observing the adhesive transfer to the surface of a stainless-steel plate with the following evaluation criteria: ◯—good removability of the pressure-adhesive layer without a residual adhesive left on the surface of the stainless-steel plate; X—unsatisfactory removability with a residual adhesive left on the surface of the stainless-steel plate.

Practical Example 1

A mixture was prepared from the following components: 25.6 parts by weight of a raw rubberlike copolymer of a methylvinylsiloxane and dimethylsiloxane capped at both molecular terminals with dimethylvinylsiloxy groups and having vinyl groups in a part of the side chain (plasticity 135, vinyl group content 0.04 wt. %); 54.6 parts by weight of a 60 wt. % xylene-diluted solution of a methylpolysiloxane resin consisted of $(CH_3)_3SiO_{1/2}$ units and $SiO_{4/2}$ units with a 0.8 mole ratio of $(CH_3)_3SiO_{1/2}$ to $SiO_{4/2}$ units; 0.2 parts by weight of a methylhydrogenpolysiloxane capped at both molecular terminals with trimethylsiloxy groups and having viscosity of 20 mPa·s (content of silicon-bonded hydrogen atoms 1.55 wt. %); 0.1 part by weight of 2-methyl-3-butyn-2-ol; 0.15 parts by weight of a hindered-phenol type oxidation inhibitor [n-octyl-3-(4'-hydroxy-3',5'-di-tert-butylphenyl) propionate] represented by the following formula:

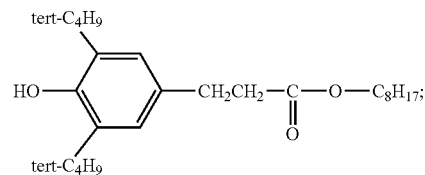

0.15 parts by weight of a diphenylamine-type oxidation inhibitor represented by the following formula:

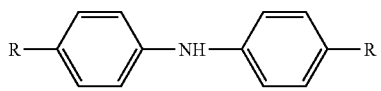

(where R is a mixture of H and tert-$C_8H_{17}$); and 70.3 parts by weight of toluene. The obtained mixture was further combined with a complex of platinum and 1,3-divinyl-1,1,3,3-tetramethyldisiloxane (in such an amount that in weight units the content of metallic platinum in the complex becomes 100 ppm per sum of the methylpolysiloxane resin and the aforementioned uncured copolymer of methylvinylsiloxane and dimethylsiloxane). As a result, a silicone-based pressure-sensitive adhesive with 40 wt. % of the organopolysiloxane component was produced. An adhesive tape was produced by using the obtained silicone-based pressure-sensitive adhesive. The obtained adhesive tape was tested with regard to cohesive strength and removability. The results are shown in Table 1.

Comparative Example 1

A silicone-based pressure-sensitive adhesive was prepared by the same method as in Practical Example 1, with the exception that 0.30 parts of a diphenylamine-type oxidation inhibitor was used instead of the hindered-phenol type oxidation inhibitor. An adhesive tape was produced by using the obtained silicone-based pressure-sensitive adhesive. The obtained adhesive tape was tested with regard to cohesive strength and removability. The results are shown in Table 1.

Comparative Example 2

A silicone-based pressure-sensitive adhesive was prepared by the same method as in Practical Example 1, with the exception that 0.30 parts of a hindered-phenol type oxidation inhibitor was used instead of the diphenylamine-type oxidation inhibitor. An adhesive tape was produced by using the obtained silicone-based pressure-sensitive adhesive. The obtained adhesive tape was tested with regard to cohesive strength and removability. The results are shown in Table 1.

TABLE 1

| | Pr. Ex. 1 | Comp. Ex. 1 | Comp. Ex. 2 |
|---|---|---|---|
| Cohesive strength (N/m) | 264 | 272 | 266 |
| Removability (temperature) | | | |
| 200° C. | ○ | ○ | ○ |
| 210° C. | ○ | ○ | ○ |
| 220° C. | ○ | ○ | ○ |
| 230° C. | ○ | ○ | ○ |
| 240° C. | ○ | ○ | ○ |
| 250° C. | ○ | ○ | ○ |
| 260° C. | ○ | X | X |
| 270° C. | ○ | X | X |
| 280° C. | ○ | X | X |
| 290° C. | X | X | X |

Practical Example 2

A mixture was prepared from the following components: 25.6 parts by weight of a raw rubberlike copolymer of a methylvinylsiloxane and dimethylsiloxane capped at both molecular terminals with dimethylvinylsiloxy groups and having vinyl groups in a part of the side chain (plasticity 136, vinyl group content 0.04 wt. %); 54.6 parts by weight of a 60 wt. % xylene-diluted solution of a methylpolysiloxane resin consisted of $(CH_3)_3SiO_{1/2}$ units and $SiO_{4/2}$ units with a 0.8 mole ratio of $(CH_3)_3SiO_{1/2}$ to $SiO_{4/2}$ units; 0.2 parts by weight of a methylhydrogenpolysiloxane capped at both molecular terminals with trimethylsiloxy groups and having viscosity of 20 mPa·s (content of silicon-bonded hydrogen atoms 1.55 wt. %); 0.1 parts by weight of 2-methyl-3-butyn-2-ol; 0.15 parts by weight of a phenol-modified dimethylsiloxane represented by the following formula:

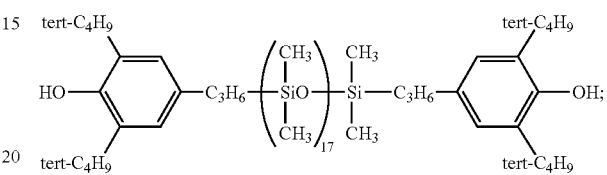

0.15 parts by weight of an aromatic amino-modified dimethylsiloxane represented by the following formula:

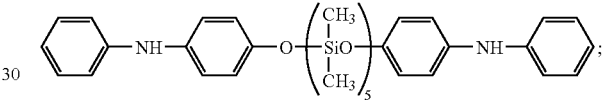

and 70.3 parts by weight of toluene. The obtained mixture was further combined with a complex of platinum and 1,3-divinyl-1,1,3,3-tetramethyldisiloxane (in such an amount that in weight units the content of metallic platinum in the complex becomes 100 ppm per sum of the methylpolysiloxane resin and the aforementioned uncured copolymer of methylvinylsiloxane and dimethylsiloxane). As a result, a silicone-based pressure-sensitive adhesive with 40 wt. % of the organopolysiloxane component was produced. An adhesive tape was produced by using the obtained silicone-based pressure-sensitive adhesive. The obtained adhesive tape was tested with regard to cohesive strength and removability. The results are shown in Table 2.

Comparative Example 3

A silicone-based pressure-sensitive adhesive was prepared by the same method as in Practical Example 2, with the exception that 0.30 parts of an aromatic amino-modified dimethylsiloxane was used instead of the phenol-modified dimethylsiloxane. An adhesive tape was produced by using the obtained silicone-based pressure-sensitive adhesive. The obtained adhesive tape was tested with regard to cohesive strength and removability. The results are shown in Table 2.

Comparative Example 4

A silicone-based pressure-sensitive adhesive was prepared by the same method as in Practical Example 2, with the exception that 0.30 part of a phenol-modified dimethylsiloxane was used instead of the aromatic amino-modified dimethylsiloxane. An adhesive tape was produced by using the obtained silicone-based pressure-sensitive adhesive. The obtained adhesive tape was tested with regard to cohesive strength and removability. The results are shown in Table 2.

TABLE 2

|  | Pr. Ex. 2 | Comp. Ex. 3 | Comp. Ex. 4 |
|---|---|---|---|
| Cohesive strength (N/m) | 274 | 276 | 268 |
| Removability (temperature) |  |  |  |
| 200° C. | ◯ | ◯ | ◯ |
| 210° C. | ◯ | ◯ | ◯ |
| 220° C. | ◯ | ◯ | ◯ |
| 230° C. | ◯ | ◯ | ◯ |
| 240° C. | ◯ | ◯ | ◯ |
| 250° C. | ◯ | ◯ | ◯ |
| 260° C. | ◯ | X | X |
| 270° C. | ◯ | X | X |
| 280° C. | ◯ | X | X |
| 290° C. | X | X | X |

INDUSTRIAL APPLICABILITY

The silicone-based pressure-sensitive adhesive of the present invention is suitable for forming the pressure-sensitive adhesive layer of an adhesive tape that is characterized by good removability after exposure to high temperatures. Due to good removability after exposure to high temperatures, the adhesive tape of the invention can be used as a masking tape for heat treatment in solder reflow processes on printed-circuit boards.

The invention claimed is:

1. A silicone-based pressure-sensitive adhesive comprising:
   (A) a mixture or a partial condensation product of (a) a raw rubberlike organopolysiloxane having an average of at least one alkenyl group per molecule, and (b) an organopolysiloxane resin consisting essentially of $R^1_3SiO_{1/2}$ units wherein $R^1$ is a substituted or unsubstituted univalent hydrocarbon group and $SiO_{4/2}$ units, with a molar ratio of $R^1_3SiO_{1/2}$ units to $SiO_{4/2}$ units within the range of 0.5 to 1.5;
   (B) an organopolysiloxane having an average of at least two silicon-bonded hydrogen atoms per molecule, wherein the silicon-bonded hydrogen atoms of this component are present in an amount of 0.5 to 150.0 moles per 1 mole of the alkenyl groups in component (A);
   (C) a phenol-type oxidation inhibitor and/or a phenol-modified organosiloxane in an amount of 0.001 to 10 parts by weight per 100 parts by weight of the sum of components (A) and (B);
   (D) an aromatic amino-type oxidation inhibitor and/or aromatic amino-modified organosiloxane in an amount of 0.001 to 10 parts by weight per 100 parts by weight of the sum of components (A) and (B); and
   (E) a platinum-based catalyst in an amount sufficient for curing the adhesive.

2. A silicone-based pressure-sensitive adhesive according to claim 1, wherein the phenol-type oxidation inhibitor of component (C) is a hindered-phenol type oxidation inhibitor.

3. A silicone-based pressure-sensitive adhesive according to claim 1, wherein the phenol-modified organosiloxane of component (C) is represented by the following average formula:

$$R^3_a SiO_{(4-a)/2}$$

wherein $R^3$ is a substituted or unsubstituted univalent hydrocarbon group, a hydroxyphenyl-containing group represented by the following general formula:

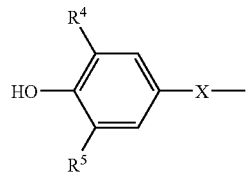

wherein $R^4$ and $R^5$ are the same or different branched- or linear-chain alkyl groups with 1 to 10 carbon atoms, and X is a single bond, oxy group, alkylene group, oxyalkylene group, or an alkylene carbonyloxyalkylene group, or a hydroxyphenyl-containing group represented by the following general formula:

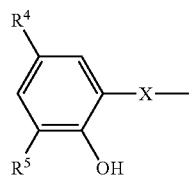

wherein $R^4$, $R^5$, and X are the same as defined above; with the proviso that at least one $R^3$ in one molecule is represented by any of the aforementioned hydroxyphenyl-containing groups, and "a" is a number between 1.5 and 3.0.

4. A silicone-based pressure-sensitive adhesive according to claim 1, wherein the aromatic amine-type oxidation inhibitor of component (D) is a diphenylamine-type oxidation inhibitor or a p-phenylenediamine-type oxidation inhibitor.

5. A silicone-based pressure-sensitive adhesive according to claim 1, wherein the aromatic amino-modified organopolysiloxane of component (D) is represented by the following average formula:

$$R^6_b SiO_{(4-b)/2}$$

wherein $R^6$ is a substituted or unsubstituted univalent hydrocarbon group, an aromatic amino-containing group represented by the following general formula:

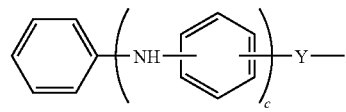

wherein Y is a single bond, oxy group, alkylene group, or an oxyalkylene group, and "c" is 1 or 2, or an aromatic amino-containing group represented by the following general formula:

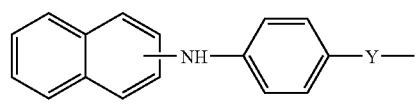

wherein Y is the same as defined above; with the proviso that at least one $R^6$ per molecule is represented by any of the aforementioned aromatic amino-containing groups, and "b" is a number between 1.5 and 3.

6. An adhesive tape comprising a film substrate and a silicone-based pressure-sensitive adhesive layer formed by curing the silicone-based pressure-sensitive adhesive, as claimed in claim 1, on said film substrate.

* * * * *